United States Patent
Tsugita

[11] Patent Number: 5,999,993
[45] Date of Patent: Dec. 7, 1999

[54] DATA TRANSFER SYSTEM HAVING FUNCTION OF PREVENTING ERROR CAUSED BY SUSPENSION OF DATA TRANSFER TO IMMEDIATELY SERVICE TRANSFER INTERRUPTED REQUEST

[75] Inventor: Masami Tsugita, Tokyo, Japan

[73] Assignee: NEC Corporation, Tokyo, Japan

[21] Appl. No.: 08/808,547

[22] Filed: Feb. 28, 1997

[30] Foreign Application Priority Data

Feb. 28, 1996  [JP]  Japan ..................................... 8-041145

[51] Int. Cl.⁶ ..................................................... G06F 13/24
[52] U.S. Cl. .............................. 710/32; 710/48; 710/260; 710/266
[58] Field of Search ......................... 395/182.16, 185.01, 395/185.02, 733, 739, 842, 852, 856, 868, 867, 872, 873; 710/32, 36, 47, 48, 260, 261, 262, 266

[56] References Cited

U.S. PATENT DOCUMENTS

| | | | |
|---|---|---|---|
| 4,275,440 | 6/1981 | Adams, Jr. et al. | 710/48 |
| 4,435,761 | 3/1984 | Kimoto | 395/560 |
| 5,138,704 | 8/1992 | Takahashi et al. | 395/800.2 |
| 5,404,548 | 4/1995 | Nishioka | 395/872 |
| 5,428,801 | 6/1995 | Murano et al. | 395/500 |
| 5,440,694 | 8/1995 | Nakajima | 395/873 |
| 5,524,112 | 6/1996 | Azuma et al. | 370/402 |
| 5,530,673 | 6/1996 | Tobita et al. | 365/185.09 |
| 5,542,076 | 7/1996 | Benson et al. | 395/733 |
| 5,577,260 | 11/1996 | Sakuma | 395/285 |
| 5,724,549 | 3/1998 | Selgas et al. | 711/141 |
| 5,724,609 | 3/1998 | Hatae et al. | 395/842 |

FOREIGN PATENT DOCUMENTS 61-289749  12/1986  Japan .

*Primary Examiner*—Xuan M. Thai
*Attorney, Agent, or Firm*—Foley & Lardner

[57] ABSTRACT

A data transfer system including a data transmission unit and a data reception unit, the data transmission unit including an arithmetic unit which, when accepting an interruption during data transfer, suspends processing in execution and immediately switches to a mode for executing the interruption processing, and the data reception unit including a received data accepting unit for temporarily accumulating received data, a data storage unit for receiving and storing received data accumulated at the received data accepting unit after the data transfer processing is completed, and a transfer control unit for inhibiting processing of shifting received data accumulated at the received data accepting unit to the data storage unit when detecting suspension of the data transfer processing due to generation of an interruption at the data transmission unit.

10 Claims, 5 Drawing Sheets

DATA TRANSFER SYSTEM HAVING FUNCTION OF PREVENTING ERROR CAUSED BY SUSPENSION OF DATA TRANSFER TO IMMEDIATELY SERVICE TRANSFER INTERRUPTED REQUEST

BACKGROUND OF THE INVENTION

1. Field of the Invention

The present invention relates to a data transfer system and, more particularly, to a data transfer system, in a system whose operation timing after the acceptance of interruption processing is required to be stable, which has a function of suspending data transfer to give priority to interruption processing when an interruption occurs during the data transfer and preventing an error caused by the suspension of data transfer.

2. Description of the Related Art

In a data transfer system in which data to be transferred is divided and divisionally transferred several times, when interruption processing occurs during data transfer, it is a common practice to maintain the data transfer state until the transfer of the data being transferred is completed and proceed to interruption processing operation after the completion of the data transfer processing, thereby preventing data transfer error from occurring.

Figure 6:
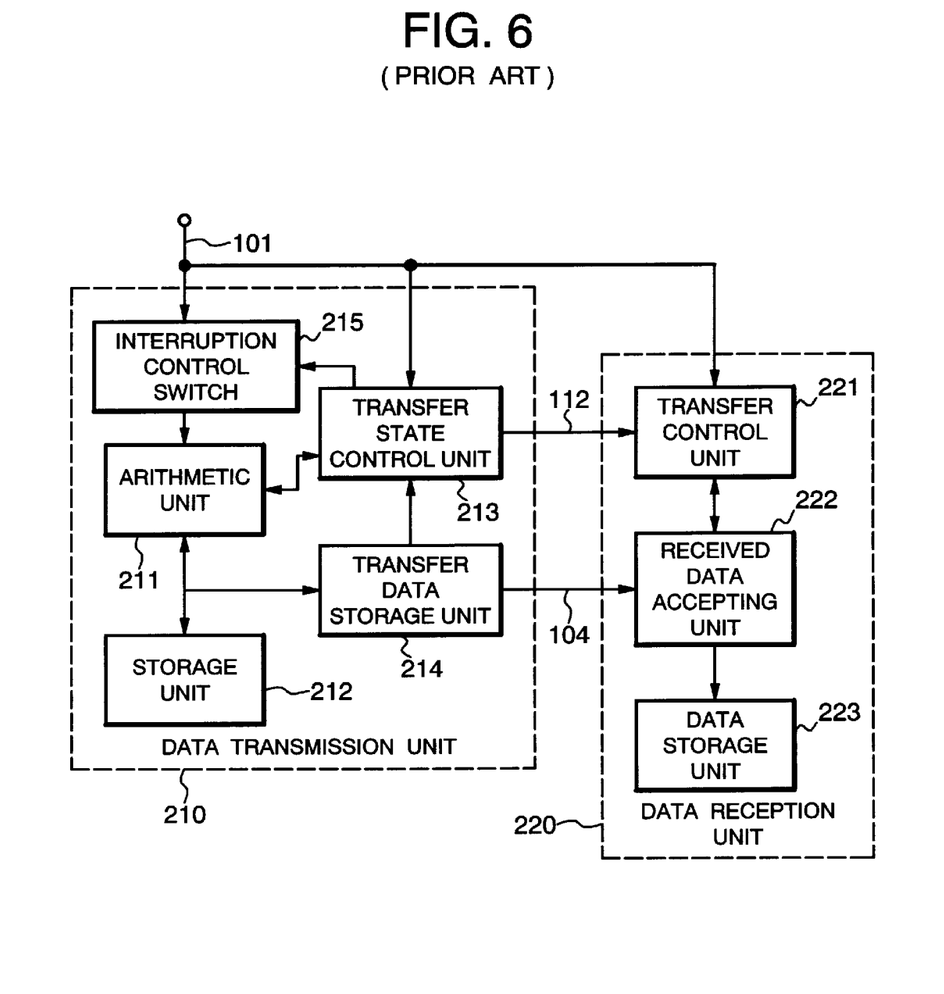
FIG. 6 is a block diagram showing structure of a conventional data transfer system.

FIG. 6 shows structure of a conventional data transfer system of this kind. The conventional data transfer system shown in FIG. 6 includes a data transmission unit 210 for transmitting data and a data reception unit 220 for receiving data transmitted by the data transmission unit 210. The data transmission unit 210 includes an arithmetic unit 211, a storage unit 212, a transfer state control unit 213, a transfer data storage unit 214 and an interruption control switch 215. The data reception unit 220 includes a transfer control unit 221, a received data accepting unit 222 and a data storage unit 223. With the above-described structure, data whose arithmetical processing has been conducted by the arithmetic unit 211 of the data transmission unit 210 is transferred to the data reception unit 220.

When transferring no data, the data transmission unit 210 stores data whose arithmetical processing has been conducted at the arithmetic unit 211 in the transfer data storage unit 214 to enter a next processing waiting state. When data transfer is started, first, a data reading timing signal 112 is output from the transfer state control unit 213 and sent to the transfer control unit 221 of the data reception unit 220. In addition, the data held at the transfer data storage unit 214 is bit-serially output in synchronization with the data reading timing signal 112 output by the transfer state control unit 213, so that serial data 104 is transferred to the data reception unit 220. The data reception unit 220 receives the transferred data 104 and stores the same at the received data accepting unit 222. As a result of the foregoing operation, data transfer from the data transmission unit 210 to the data reception unit 220 finishes.

While data transfer from the data transmission unit 210 to the data reception unit 220 is under way, when an external interruption signal 101 is applied, the interruption signal 101 is held in the interruption control switch 215 based on a control signal supplied from the transfer state control unit 213 until the data transfer is completed. Then, after the completion of the data transfer, switching of the interruption control switch 215 is conducted such that the interruption signal 101 is transmitted to the arithmetic unit 211. This prevents data transfer error from occurring which is caused by interruption processing occurring during data transfer.

One of the above-described conventional data transfer systems is, for example, a data transfer system disclosed in Japanese Patent Laying Open (Kokai) No. Showa 61-289749, entitled "Serial Data Transfer Device".

Figure 7:
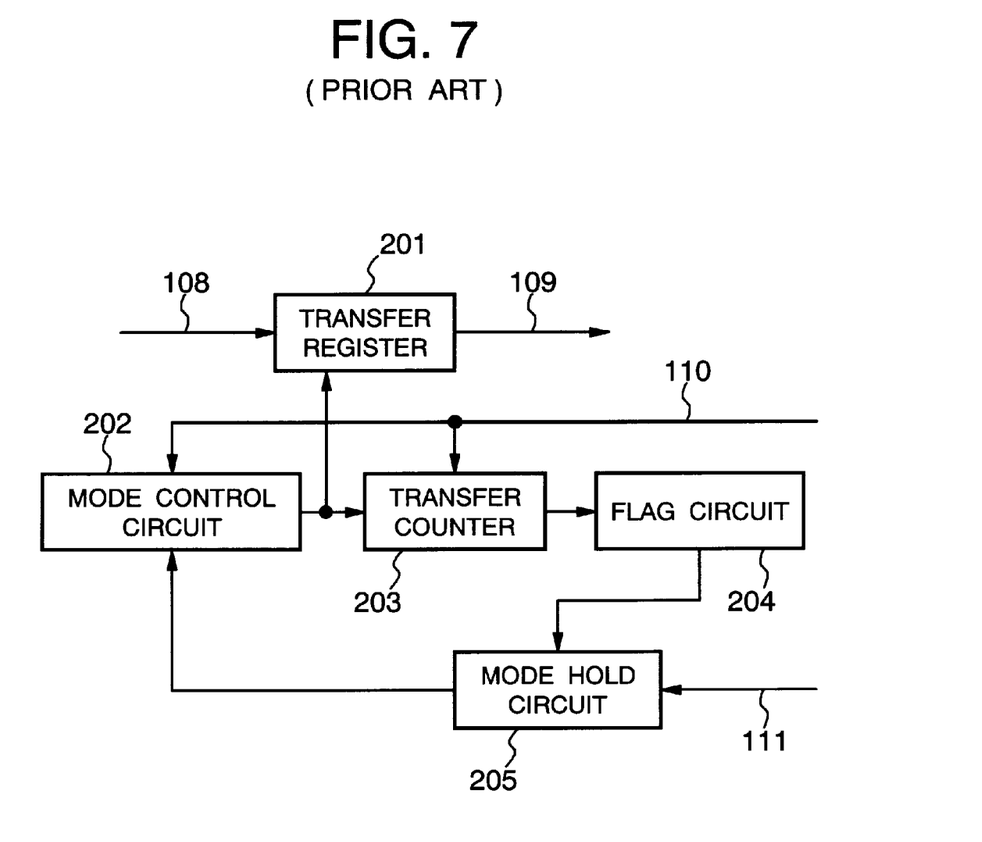
FIG. 7 is a block diagram showing structure of a data transfer device in another conventional data transfer system.

FIG. 7 shows structure of a transmission unit for use in the data transfer system recited in the above-described literature. As illustrated in FIG. 7, the transmission unit according to the present related art includes a transfer register 201, a mode control circuit 202, a transfer counter 203, a flag circuit 204 and a mode hold circuit 205. The mode control circuit 202 is supplied with a transfer start signal 110 and an output of the mode hold signal circuit 205. The mode hold circuit 205 is supplied with a mode designation signal 111. The transfer register 201 is supplied with a data signal 108 and a control signal output from the mode control circuit 202.

The transfer register 201 receives input of the data signal 108 to transfer data bit-serially based on a control signal. In other words, the transfer register outputs the data signal 108 as serial data 109. The transfer counter 203 counts a volume of output data transfer. The flag circuit 204 is set by the externally supplied transfer start signal 110 and is reset upon detection of overflow of the transfer counter 203. With the foregoing structure, when the flag circuit 204 detects overflow of the transfer counter 203, data is read on a bus line, so that transfer of the serial data 109 is completed. On the other hand, during data transfer, control operation is being conducted such that an operation mode is not switched, thereby disabling intervention of other interruption processing to prevent an error from occurring during data transfer.

In practical use, however, there exists such a system as is incapable of waiting for data transfer to end when an interruption occurs during data transfer, that is, a system required to synchronize with an interruption instruction. To this kind of system, conventional art is not directly applicable in which interruption processing is waited for until the end of data transfer in order to prevent the above-described transfer error. As an example of a system of this kind, a vertical deflection correction system on a horizontal/vertical synchronization signal frequency variable type display will be described. Vertical deflection correction in this system aims to conduct correction of screen display position, screen size, and distortion of a display screen.

In vertical deflection correction by a conventional vertical deflection correction system, there are, as synchronization signals of image, a vertical synchronization signal (a signal for determining a vertical position of a scanning line on a screen) and a horizontal synchronization signal (a signal for determining a horizontal position of a scanning line on a screen). Through the generation of a correction current in response to each synchronization signal, a scanning line is controlled to correct a display screen. A correction signal for a vertical position control signal of a common scanning line is a triangular wave signal in which a low voltage, for example, denotes an upper part of the screen and an increasing voltage denotes that a scanning line shifts toward a lower part of the screen. As a voltage of a correction signal increases gradually, a scanning line is moved downward on the screen. At the time point when the voltage increases to the maximum, that is, at a time point when the scanning line is moved to the lowermost end of the screen, the voltage is decreased at a breath in synchronization with a vertical synchronization signal to start subsequent scanning from the uppermost end of the screen. While a voltage is being decreased, no scanning line is displayed on the screen. In addition, various arithmetical processing is conducted using a triangular wave signal of a correction signal. Deformation of a waveform of a triangular wave therefore leads to control for the above-described respective corrections etc.

When conducting arithmetical processing and data transfer processing (correction waveform output) repeatedly, such a data transfer system as the above-described vertical deflection correction system needs to forcibly suspend arithmetical processing and data transfer processing, conduct interruption processing in response to a vertical synchronization signal and conduct all the processing thereafter, with a vertical synchronization signal as a starting point. To control a horizontal/vertical synchronization signal frequency variable type display, it should be operated at various frequencies of a synchronization signal. There is therefore no knowing at which timing of data processing a vertical synchronization signal is applied, and there is accordingly a possibility of occurrence of an interruption during data transfer.

In this case, if no switching to an interruption mode is made in synchronization with a vertical synchronization signal (interruption signal) in order not to cause a data transfer error as in the above-described data transfer system shown in FIGS. 6 and 7, a time from the application of the above-mentioned interruption signal until entering an interruption operation mode will appear as a variable time for starting subsequent data processing. In other words, if a time before processing starts after the application of a vertical synchronization signal is inconstant, a scanning line will be displaced on a screen to the extent of variation of a time before data transfer ends after an interruption signal is applied and the displacement will appear as jitter. On an actual screen, display dots fluctuate vertically as a result.

As described in the foregoing, in a case where interruption processing is generated during data transfer, in order to prevent an error which is derived from imperfect data transfer caused as a result of the suspension of the data transfer by the interruption, a conventional data transfer system is controlled such that the interruption processing generated during the data transfer waits for the data transfer to end. For a system required to have stable operation timing after the acceptance of interruption processing such as a vertical deflection correction system for use in generation and adjustment of a vertical synchronization signal of a display, however, control for waiting interruption processing can not be conducted as it is because with such control, a time for shifting to an interruption operation mode, from the input of an interruption signal until the end of data transfer output, will be a variable time for starting data processing.

In addition, in such a system required to have constant operation timing after the acceptance of interruption processing as described above, if, at the time of the generation of interruption processing during data transfer, the data transfer is suspended to execute the interruption processing in order to give higher priority to stabilization of operation timing, occurrence of the above-described data transfer error will be invited.

SUMMARY OF THE INVENTION

An object of the present invention is to provide, in a system required to have constant operation timing after the acceptance of interruption processing, a data transfer system which suspends, when interruption processing is generated during data transfer, the data transfer to conduct the interruption processing and inhibits imperfect data accumulated by the suspended data transfer from flowing out, thereby preventing an error from occurring.

According to one aspect of the invention, a data transfer system comprises a data transmission means for transmitting data; and a data reception means for receiving data transmitted from the data transmission means;

the data transmission means accepting an interruption during data processing, wherein the data transmission means comprising:

arithmetic means for suspending, when accepting an interruption during data processing, the processing in execution to immediately switch to a mode for executing the interruption processing; and the data reception means comprising:

received data accepting means for temporarily accumulating received data transferred from the data transmission means;

data storage means for receiving and storing received data accumulated at the received data accepting means after the data transfer processing is completed; and transfer control means for inhibiting processing of shifting the received data accumulated at the received data accepting means to the data storage means when detecting the suspension of data transfer processing caused by the generation of an interruption at the data transmission means.

In the preferred construction, the data transfer system further comprises gate means for connecting the received data accepting means and the data storage means and controlling switching of the same, wherein the transfer control means controls the gate means to connect the received data accepting means and the data storage means when processing of transferring data from the data transmission means is completed and disconnect the received data accepting means and the data storage means when the processing of transferring data from the data transmission means is suspended.

In the preferred construction, upon receiving input of an interruption signal generated for executing interruption processing at the data transmission means, the transfer control means detects suspension of data transfer caused by the generation of an interruption at the data transmission means.

In another preferred construction, the data transfer system further comprises gate means for connecting the received data accepting means and the data storage means and controlling switching of the same, wherein the transfer control means upon receiving input of an interruption signal generated for executing interruption processing at the data transmission means, detects suspension of data transfer caused by the generation of an interruption at the data transmission means, and controls the gate means to connect the received data accepting means and the data storage means when processing of transferring data from the data transmission means is completed and disconnect the received data accepting means and the data storage means when the processing of transferring data from the data transmission means is suspended.

In another preferred construction, the data transmission means, when accepting an interruption during data transfer, invalidates the data being transferred.

According to another aspect of the invention, a data transfer system comprises a data transmission means for transmitting data; and a data reception means for receiving data transmitted from the data transmission means;

the data transmission means accepting an interruption during data processing, wherein the data transmission means comprising:

arithmetic means for suspending, when accepting an interruption during data processing, the processing in execution to immediately switch to a mode for executing the interruption processing; and state control means for notifying the data reception means of a data transfer processing execution status and information indicative of the suspension of data transfer processing caused by the acceptance of an interruption during data transfer; and the data reception means comprising:

received data accepting means for temporarily accumulating received data transferred from the data transmission means;

data storage means for receiving and storing received data accumulated at the received data accepting means after the data transfer processing is completed; and transfer control means for inhibiting processing of shifting the received data accumulated at the received data accepting means to the data storage means when receiving a notification of the suspension of data transfer processing from the state control means of the data transmission means.

In the above-mentioned construction, the data transfer system further comprises gate means for connecting the received data accepting means and the data storage means and controlling switching of the same, wherein the transfer control means controls the gate means according to the state of data transfer processing determined based on the notification from the state control means to connect the received data accepting means and the data storage means when the processing of transferring data from the data transmission means is completed and disconnect the received data accepting means and the data storage means when the processing of transferring data from the data transmission means is suspended.

In the preferred construction, the state control means transmits flag data as the information indicative of an execution status and suspension of data transfer processing to the data reception means, sets up the flag data so as to demand preparation for data reception at the data reception means prior to the execution of the data transfer processing and restores the flag data when the data transfer is completed or suspended, and the transfer control means, when the flag data is restored before data to be transferred is all transferred, determines that the data transfer processing is suspended.

In the preferred construction, the data transfer system further comprises gate means for connecting the received data accepting means and the data storage means and controlling switching of the same, wherein the state control means transmits flag data as the information indicative of an execution status and suspension of data transfer processing to the data reception means, sets up the flag data to demand preparation for data reception at the data reception means prior to the execution of the data transfer processing and restores the flag data when the data transfer is completed or suspended, and the transfer control means controls the gate means according to the state of the data transfer processing determined based on the state of the flag data sent from the state control means to connect the received data accepting means and the data storage means when the flag data is restored after data to be transferred is all transferred and disconnect the received data accepting means and the data storage means when the flag data is restored before data to be transferred is all transferred.

In another preferred construction, when accepting an interruption during data transfer, the data transmission means invalidates data being transferred.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
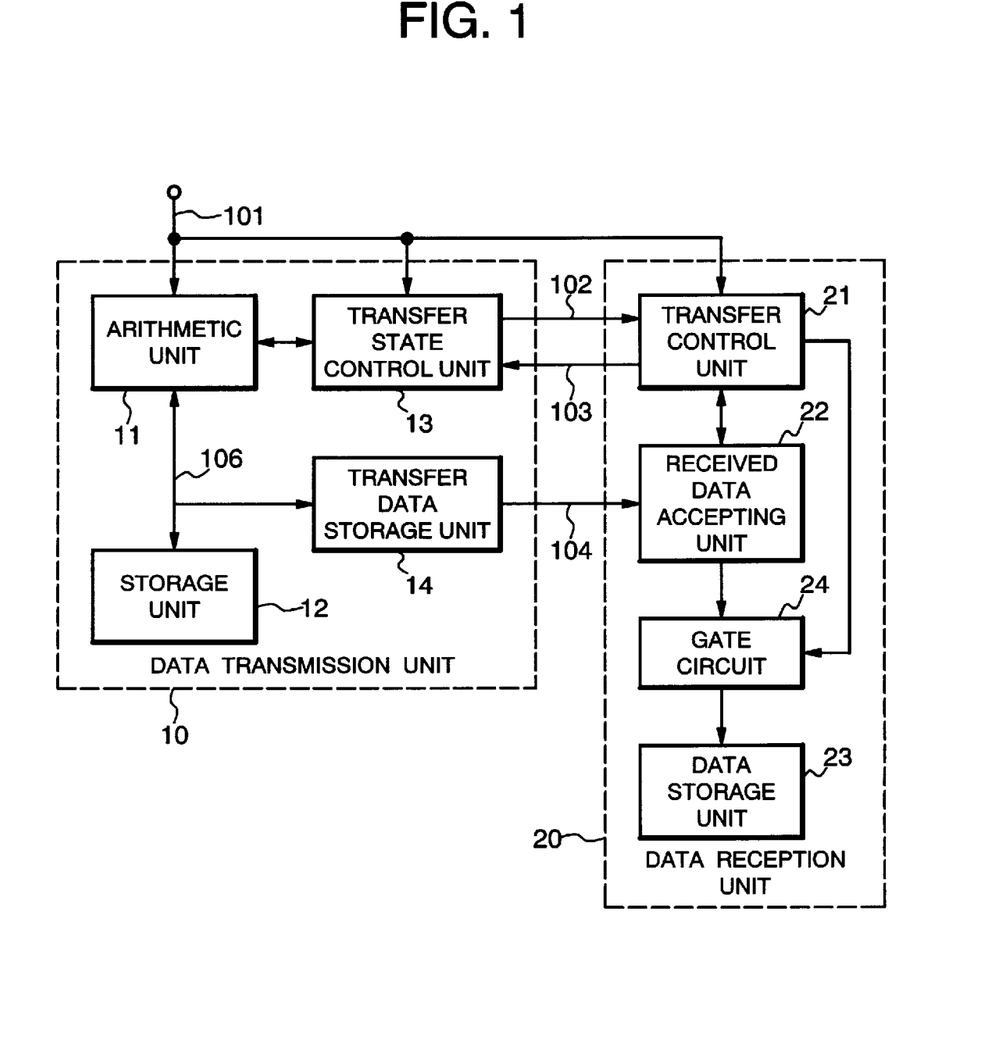
FIG. 1 is a block diagram showing structure of a data transfer system according to one embodiment of the present invention.

FIG. 1 is a block diagram showing structure of a data transfer system according to one embodiment of the present invention.

As illustrated in the figure, the data transfer system of the present embodiment includes a data transmission unit 10 for transmitting data and a data reception unit 20 for receiving data transmitted by the data transmission unit 10. The data transmission unit 10 includes an arithmetic unit 11, a storage unit 12, a transfer state control unit 13 and a transfer data storage unit 14. The data reception unit 20 includes a transfer control unit 21, a received data accepting unit 22, a gate 24 and a data storage unit 23.

In the data transmission unit 10, the arithmetic unit 11, which is implemented, for example, by a program-controlled CPU, conducts various arithmetical processing to produce data 106 to be transmitted to the data reception unit 20. The produced data 106 is stored in the transfer data storage unit 14.

The storage unit 12, which is implemented, for example, by an internal memory such as a RAM, is used as necessary in arithmetical processing by the arithmetic unit 11 or various operation at the data transmission unit 10.

The transfer state control unit 13, which is implemented, for example, by a program-controlled CPU, conducts state control with respect to data transfer processing at the data transmission unit 10. More specifically, the unit 13 controls a transfer state flag which indicates whether the data transmission unit 10 is executing data transfer or not and also sends a transfer allowance requesting flag 102 to the data reception unit 20 according to a state of data transfer processing. The transfer allowance requesting flag 102 is flag data for demanding preparation for receiving the data 106 of the data reception unit 20 and is assumed, for example, to be at a high level when transfer starts and at a low level when transfer ends. The transfer state control unit 13 also accepts a read signal 103 sent from the data reception unit 20 to control such operation as start, end and suspension of data transfer.

The transfer data storage unit 14, which is implemented, for example, by a program-controlled CPU and an internal memory such as a RAM, stores the data 106 produced at the arithmetic unit 11. Then, when the transfer state control unit 13 accepts the read signal 103, the unit 14 outputs its held transfer data as serial transfer data 104 and transfers the same to the data reception unit 20.

In the data reception unit 20, upon receiving the transfer allowance requesting flag 102 from the data transmission unit 10, the transfer control unit 21, which is implemented, for example, by a program-controlled CPU, sends back the read signal 103 to demand start of transfer of the serial transfer data 104. In addition, after completing reception of the serial transfer data 104, the unit 21 outputs a gate control signal 105 to control the gate circuit 24.

The received data accepting unit 22, which is implemented, for example, by a program-controlled CPU and an internal memory such as a RAM, receives and accumulates input of the serial transfer data 104 transferred from the data transmission unit 10.

The gate circuit 24 connects the received data accepting unit 22 and the data storage unit 23 under the control of the transfer control unit 21 to shift the serial transfer data 104 accumulated at the received data accepting unit 22 to the data storage unit 23.

The data storage unit 23, which is implemented, for example, by an internal memory such as a RAM and an external storage device such as a magnetic disk device, ultimately stores data transferred from the data transmission unit 10.

Operation of thus structured data transfer system will be schematically described.

When transferring no data, the data transmission unit 10 stores the data 106 subjected to arithmetical processing at the arithmetic unit 11 in the transfer data storage unit 14 to enter a subsequent processing waiting state. When data transfer is started, first, the transfer allowance requesting flag 102 (set at a high level, for example) indicative of the start of data transfer is output from the transfer state control unit 13 and sent to the transfer control unit 21 of the data reception unit 20. At this time point, when the data reception unit 20 is at a data receivable state, the read signal 103 is output from the transfer control unit 21 of the data reception unit 20 and sent to the transfer state control unit 13. When the transfer state control unit 13 receives the read signal 103, the data 106 stored in the transfer data storage unit 14 is output as serial transfer data 104 and transferred to the data reception unit 20. In a case where the serial transfer data 104 is divisionally transferred a plurality of times, the read signal 103 is repeatedly transmitted as many time as the number of times of transfer of the serial transfer data 104. In response thereto, divided serial transfer data 104 is sequentially transferred from the transfer data storage unit 14 of the data transmission unit 10. The data reception unit 20 accepts the serial transfer data 104 at the received data accepting unit 22 and holds the same.

At the time of transferring last data of the serial transfer data 104, the transfer allowance requesting flag 102 (set at a low level, for example) indicative of the end of data transfer is output from the transfer state control unit 13 and sent to the transfer control unit 21 of the data reception unit 20. Upon receiving the transfer allowance requesting flag 102, the transfer control unit 21 of the data reception unit 20 outputs the read signal 103. In response thereto, the last data is transferred to complete the transfer of all the serial transfer data 104. Upon determining by the transfer allowance requesting flag 102 that data transfer is completed, the transfer control unit 21 outputs the gate control signal 105 to control the gate circuit 24, thereby connecting the received data accepting unit 22 and the data storage unit 23. As a result, the data held at the received data accepting unit 22 is shifted to the data storage unit 23 via the gate circuit 24 and stored there.

Next, description will be made of operation to be conducted when an external interruption signal 101 is applied during data transfer from the data transmission unit 10 to the data reception unit 20.

The interruption signal 101 is supplied to the arithmetic unit 11, the transfer state control unit 13 and the transfer control unit 21. At the data transmission unit 10, upon receiving input of the interruption signal 101, the transfer state flag and the transfer allowance requesting flag of the transfer state control unit 13 are erased (initialized) to cause the arithmetic unit 11 to proceed to the interruption operation. At the data reception unit 20, since data transfer is not yet completed at the time of reception of the interruption signal 101, the transfer control unit 21 maintains the gate circuit 24 disconnected, which prevents imperfect transfer data accumulated at the received data accepting unit 22 from shifting to the data storage unit 23.

As described in the foregoing, suspension of data transfer can be recognized by the initialization of a flag regarding a transfer state at the data transmission unit 10 to prevent erroneous data from transferring. Also at the data reception unit 20, since imperfect transfer data accumulated at the received data accepting unit 22 is inhibited from flowing out, generation of an error derived from the imperfect data can be prevented.

Description will be next given of an embodiment in which the present invention is applied to a data transfer system using a digital signal processor (hereinafter referred to as DSP). This embodiment is a vertical deflection correction system for use in vertical deflection correction of a horizontal/vertical synchronization signal frequency variable display.

A DSP enters an interruption mode simultaneously with the input of an interruption instruction. As a control system for realizing the present system, erasing of a transfer allowance requesting flag and a transfer state flag is used to prevent erroneous data (imperfect data) from flowing out which data is generated due to suspension of data transfer by the input of an interruption signal. While the present system here controls operation timing in its own synchronization in terms of data transfer processing only, it does not synchronize with a vertical synchronization signal as main clock. With respect to the vertical synchronization signal, therefore, the system is asynchronous.

More specifically, the DSP includes a CPU or other arithmetic unit as the arithmetic unit 11 of the data transmission unit 10, a transfer status register as the transfer state control unit 13, a RAM or other memory as the storage unit 12, and a transfer data register as the transfer data storage unit 14, and a transfer status determination unit as the transfer control unit 21 of the data reception unit 20, a received data register as the received data accepting unit 22, an output register as the data storage unit 23 and a switch as the gate circuit 24. Although as the specific structure of the system for use in vertical deflection correction of a horizontal/vertical synchronization signal frequency variable type display, an A/D converter is connected to the output register as the data storage unit 23, no description will be given thereof because it is not relevant to the present embodiment.

Figure 2:
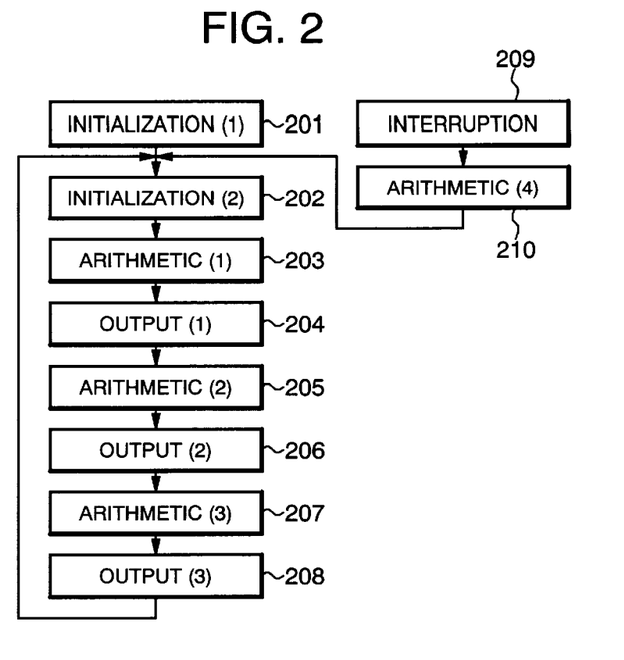
FIG. 2 is a diagram showing one example of a flow of operation according to the present embodiment.
Figure 3:
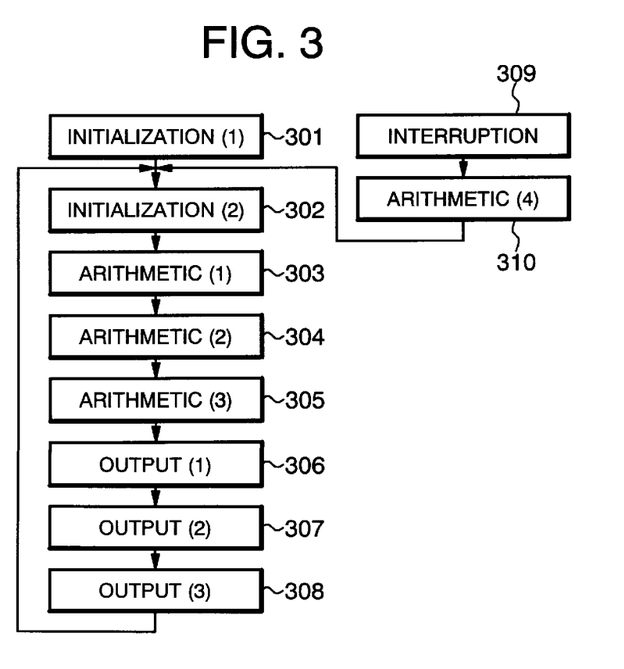
FIG. 3 is a diagram showing another example of a flow of operation according to the present embodiment.

FIGS. 2 and 3 are diagrams showing processing procedures for conducting three arithmetical processing and three output processing at the DSP of the present embodiment. FIG. 2 shows an example of a procedure of alternately repeating arithmetical processing and output processing, while FIG. 3 shows an example of that of successively conducting all the output processing after the completion of all the arithmetical processing.

As illustrated in FIG. 2, after conducting the initialization processing (1) at Step 201 as the initialization processing of the whole system, the DSP conducts the initialization processing (2) as an initial operation of a series of loop processing at Step 202, and then alternately repeats arithmetical processing and output processing at Steps 203 to 208. Then, after the completion of the output processing (3) of Step 208, the routine goes back to the initialization processing (2) of Step 202 to again conduct loop processing at Step 202 and the following steps.

When at Step 209, a vertical synchronization signal is applied as an interruption signal in asynchronization with the internal operations of Steps 202 to 208, processing regarding each flag is conducted as the processing after the interruption, which is followed by the execution of interruption processing at Step 210 such as automatic adjustment of each parameter including a gain of an output waveform etc. After the completion of the interruption arithmetical processing of Step 210, the procedure goes to Step 202 which is the first processing of the main routine to return to the loop processing starting with the initialization processing (2).

As described in the foregoing, the timing at which the vertical synchronization signal is applied as the interruption signal is asynchronous with the timing of a horizontal synchronization signal or clock of an arithmetic unit. There is therefore a case where a vertical synchronization signal is applied during data transfer. Even in this case, the system immediately proceeds to the interruption processing and after the interruption processing is completed, it resumes processing starting at Step 202.

In a case where the DSP successively conducts output processing after the completion of all the arithmetical processing as illustrated in FIG. 3, the initialization processing (1) of Step 301 which is the initialization processing of the whole system is first conducted, and then the initialization processing (2) of Step 302 as the initial operation of a series of the loop processing is conducted to execute the loop processing of Steps 303 to 308. At Steps 303 to 308, unlike the case of FIG. 2, arithmetical processing is successively conducted at the first half of the processing steps and then output processing is successively conducted at the latter half of the processing steps.

At Step 309, when a vertical synchronization signal is applied as an interruption signal in asynchronization with the internal operations of Steps 302 to 308, processing regarding each flag is conducted as the processing after the interruption, which is followed by the execution of the interruption processing at Step 310. After the interruption arithmetical processing of Step 210 is completed, the procedure goes to Step 202 which is the first processing of the main routine to conduct the loop processing starting with the initialization processing (2). As described in the foregoing, the flow of the operation to be conducted when interruption by a vertical synchronization signal is generated is the same as that of FIG. 2.

Figure 4:
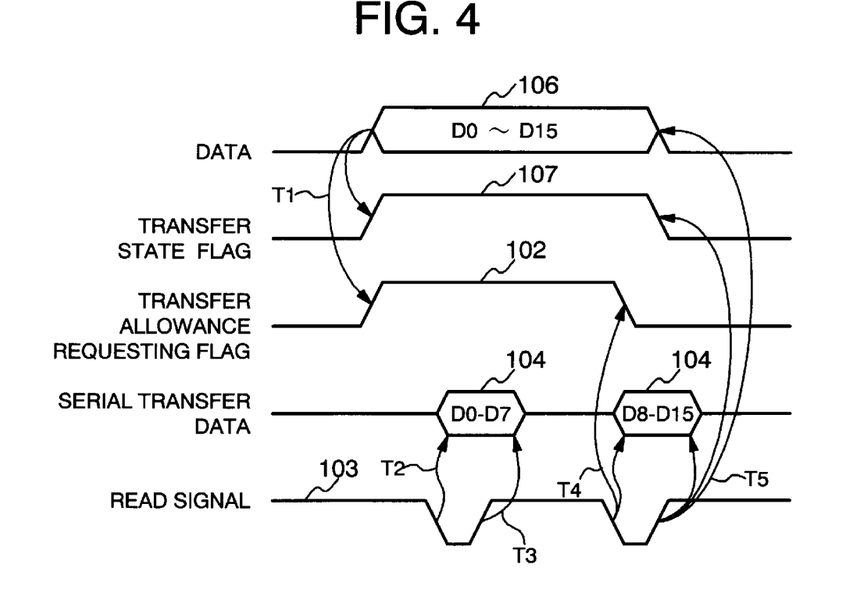
FIG. 4 is a timing chart showing operation of data transfer processing according to the present embodiment .
Figure 5:
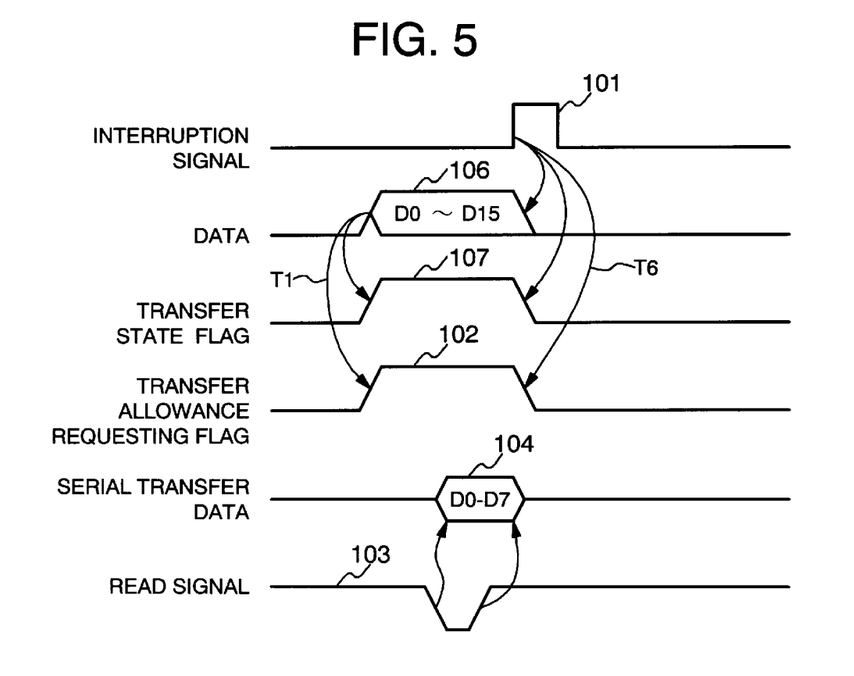
FIG. 5 is a timing chart showing operation at the time of occurrence of an interruption according to the present embodiment.

With reference to the timing charts of FIGS. 4 and 5, description will be given of operation to be conducted at the time of data transfer of a vertical deflection correction system to which the present embodiment is applied. Here, taking as an example a case where a vertical sawtooth signal is generated based on system clock and a vertical synchronization signal as a result of arithmetical processing using a DSP and various correction arithmetic is executed with respect to the signal waveform to generate and output a predetermined signal such as a vertical synchronization signal, a horizontal phase correction signal and a horizontal size correction signal, outline of the operation will be first given and then more specific description will be given of the same. Description of the components of the DSP for use in the vertical deflection correction system will be made with their names replaced by those of the components of the data transfer system according to the present embodiment described with reference to FIG. 1.

First, common data transfer operation will be described with reference to FIG. 4. It is assumed in this system that 16-bit data as an arithmetical output of the DSP is output 8 bits each two times through a 8-bit parallel line because of the feature of the DSP.

When the data 106 subjected to the arithmetical processing by the arithmetic unit 11 is stored in the transfer data storage unit 14 at timing T1, the transfer allowance requesting flag 102 and the transfer state flag 107 attain a high level. In response thereto, a first read signal is sent from the data reception unit 20 at timing T2 to conduct first transfer of the 8-bit transfer data 104. Then, a second read signal is sent at timing T4 to conduct second transfer of the transfer data 104. The first and second transfers complete the transfer of all the 16-bit data. In addition, in response to the read signal applied at timing T4, the transfer allowance requesting flag 102 attains a low level to cancel the transfer allowance request. The foregoing operation results in completion of reception and transmission of the transfer data 104.

Operation at the time of data transfer by the present system will be more specifically described. At the data transmission unit 10, when 16-bit data 106 subjected to arithmetical processing is stored in the transfer data storage unit 14, the transfer state flag 107 of the transfer state control unit 13 attains a high level at the timing T1. The data transfer requesting flag 102 output from the transfer state control unit 13 responsively attains a high level, so that it is transferred to the transfer control unit 21 of the data reception unit 20.

When the data reception unit 20 enters a data receivable state, the read signal 103 rises from the transfer control unit 21 at timing T2 and is sent to the data transmission unit 10. As a result, 8-bit of the data 106 held at the transfer data storage unit 14 is output as the transfer data 104. The data reception unit 20 receives the transfer data 104 at timing T3 at which the read signal 103 rises and stores the data in the received data accepting unit 22.

Next, when the read signal 103 again rises at timing T4 and is transmitted to the data transmission unit 10, subsequent 8 bits of the data 106 is transferred as the transfer data 104 at that timing. At the same timing, the data transfer requesting flag 102 output from the transfer state control unit 13 is caused to fall. Here, fall of the data transfer requesting flag 102 denotes that transfer of the transfer data 104 from the data transmission unit 10 to the data reception unit 20 is completed. Next, the data reception unit 20 receives the transfer data 104 at timing T5 at which the read signal 103 rises and stores the data in the received data accepting unit 22. Also at the timing T5, the transfer state control unit 13 causes the transfer state flag 102 to fall, whereby the data transfer is completed.

In the data reception unit 20, when the transfer control unit 21 receives input of the transfer state flag 102 to recognize the completion of data transfer, the unit 21 outputs the gate control signal 105 to control the gate circuit 24, thereby connecting the received data accepting unit 22 and the data storage unit 23. As a result, 16-bit received data stored at the received data accepting unit 22 is stored in the data storage unit 23.

Operation at the time of the application of an interruption signal will be described with reference to FIG. 5.

Upon receiving input of the interruption signal 101, the arithmetic unit 11 immediately proceeds to the interruption mode. When the interruption signal 101 is applied while no data is being transferred, all the flags regarding transfer status including the transfer state flag 107 and the transfer allowance requesting flag 102 are maintained at a state of non-transfer of data.

When the interruption signal 101 is applied during data transfer, the data transfer is suspended, so that in the data transmission unit 10, the arithmetic unit 11 immediately proceeds to the interruption mode. As illustrated in FIG. 5, when the interruption signal 101 is applied at timing T6, the transfer state flag 107 of the transfer state control unit 13 attains a low level at the initial time point of the interruption routine and the transfer allowance requesting flag 102 output from the transfer state control unit 13 also attains a low level, making the data held at the transfer data storage unit 14 invalid. As a result, generation of erroneous data is prevented which accompanies the suspension of data transfer due to the application of the interruption signal 101.

In response to the transfer allowance requesting flag 102 attaining a low level, the data reception unit 20 stops output of the read signal 103 by the transfer control unit 21. Since at this time point, completion of the data transfer is not confirmed, the transfer control unit 21 outputs, as a means of preventing data outflow, the gate control signal 105 to control the gate circuit 24 such that a disconnection state of the gate circuit 24 is maintained to prevent the data of the received data accepting unit 22 from outputting to the data storage unit 23. As described in the foregoing, when the interruption signal 101 is applied during data transfer, data at the received data accepting unit 22 is inhibited from flowing out into the data storage unit 23, thereby preventing generation of an error due to the suspension of the data transfer.

As described in the foregoing, in the present invention, when an interruption signal is applied during data transfer to suspend the data transfer, transfer data is erased at the data transmission side, while spooled data is inhibited from flowing out at the data reception side until completion of the data transfer is confirmed, thereby preventing generation of a data transfer error caused by the interruption occurring in asynchronization with the data transfer processing.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data transfer system comprising:

a data transmission means for transmitting data; and a data reception means for receiving data transmitted from the data transmission means;

said data transmission means accepting an interruption during data processing, wherein said data transmission means comprising:

arithmetic means for suspending, when accepting an interruption during data processing, the processing in execution to immediately switch to a mode for executing the interruption processing; and said data reception means comprising:

received data accepting means for temporarily accumulating received data transferred from said data transmission means;

data storage means for receiving and storing received data accumulated at said received data accepting means after the data transfer processing is completed; and transfer control means for inhibiting processing of shifting the received data accumulated at said received data accepting means to said data storage means when detecting the suspension of data transfer processing caused by the generation of an interruption at said data transmission means.

2. The data transfer system as set forth in claim 1, wherein upon receiving input of an interruption signal generated for executing interruption processing at said data transmission means, said transfer control means detects suspension of data transfer caused by the generation of an interruption at said data transmission means.

3. The data transfer system as set forth in claim 1, wherein said data transmission means, when accepting an interruption during data transfer, invalidates the data being transferred.

4. A data transfer system comprising:

a data transmission means for transmitting data; and a data reception means for receiving data transmitted from the data transmission means;

said data transmission means accepting an interruption during data processing, wherein said data transmission means comprising:

arithmetic means for suspending, when accepting an interruption during data processing, the processing in execution to immediately switch to a mode for executing the interruption processing; and said data reception means comprising:

received data accepting means for temporarily accumulating received data transferred from said data transmission means;

data storage means for receiving and storing received data accumulated at said received data accepting means after the data transfer processing is completed;

transfer control means for inhibiting processing of shifting the received data accumulated at said received data accepting means to said data storage means when detecting the suspension of data transfer processing caused by the generation of an interruption at said data transmission means;

gate means for connecting said received data accepting means and said data storage means and controlling switching of the same, wherein said transfer control means controls said gate means to connect said received data accepting means and said data storage means when processing of transferring data from said data transmission means is completed and disconnect said received data accepting means and said data storage means when the processing of transferring data from said data transmission means is suspended.

5. The data transfer system as set forth in claim 4, wherein said transfer control means upon receiving input of an interruption signal generated for executing interruption processing at said data transmission means, detects suspension of data transfer caused by the generation of an interruption at said data transmission means.

6. A data transfer system comprising:

a data transmission means for transmitting data; and a data reception means for receiving data transmitted from the data transmission means;

said data transmission means accepting an interruption during data processing, wherein said data transmission means comprising:

arithmetic means for suspending, when accepting an interruption during data processing, the processing in execution to immediately switch to a mode for executing the interruption processing; and state control means for notifying said data reception means of a data transfer processing execution status and information indicative of the suspension of data transfer processing caused by the acceptance of an interruption during data transfer; and said data reception means comprising:

received data accepting means for temporarily accumulating received data transferred from said data transmission means;

data storage means for receiving and storing received data accumulated at said received data accepting means after the data transfer processing is completed; and transfer control means for inhibiting processing of shifting the received data accumulated at said received data accepting means to said data storage means when receiving a notification of the suspension of data transfer processing from said state control means of said data transmission means.

7. The data transfer system as set forth in claim 6, further comprising gate means for connecting said received data accepting means and said data storage means and controlling switching of the same, wherein said state control means transmits flag data as the information indicative of an execution status and suspension of data transfer processing to said data reception means, sets up said flag data to demand preparation for data reception at said data reception means prior to the execution of the data transfer processing and restores said flag data when the data transfer is completed or suspended, and said transfer control means controls said gate means according to the state of the data transfer processing determined based on the state of the flag data sent from said state control means to connect said received data accepting means and said data storage means when said flag data is restored after data to be transferred is all transferred and disconnect said received data accepting means and said data storage means when said flag data is restored before data to be transferred is all transferred.

8. The data transfer system as set forth in claim 6, wherein when accepting an interruption during data transfer, said data transmission means invalidates data being transferred.

9. A data transfer system comprising:

a data transmission means for transmitting data; and a data reception means for receiving data transmitted from the data transmission means;

said data transmission means accepting an interruption during data processing, wherein said data transmission means comprising:

arithmetic means for suspending, when accepting an interruption during data processing, the processing in execution to immediately switch to a mode for executing the interruption processing; and state control means for notifying said data reception means of a data transfer processing execution status and information indicative of the suspension of data transfer processing caused by the acceptance of an interruption during data transfer; and said data reception means comprising:

received data accepting means for temporarily accumulating received data transferred from said data transmission means;

data storage means for receiving and storing received data accumulated at said received data accepting means after the data transfer processing is completed;

transfer control means for inhibiting processing of shifting the received data accumulated at said received data accepting means to said data storage means when receiving a notification of the suspension of data transfer processing from said state control means of said data transmission means;

gate means for connecting said received data accepting means and said data storage means and controlling switching of the same, wherein said transfer control means controls said gate means according to the state of data transfer processing determined based on the notification from said state control means to connect said received data accepting means and said data storage means when the processing of transferring data from said data transmission means is completed and disconnect said received data accepting means and said data storage means when the processing of transferring data from said data transmission means is suspended.

10. A data transfer system comprising:

a data transmission means for transmitting data; and a data reception means for receiving data transmitted from the data transmission means;

said data transmission means accepting an interruption during data processing, wherein said data transmission means comprising:

arithmetic means for suspending, when accepting an interruption during data processing, the processing in execution to immediately switch to a mode for executing the interruption processing; and state control means for notifying said data reception means of a data transfer processing execution status and information indicative of the suspension of data transfer processing caused by the acceptance of an interruption during data transfer; and said data reception means comprising:

received data accepting means for temporarily accumulating received data transferred from said data transmission means;

data storage means for receiving and storing received data accumulated at said received data accepting means after the data transfer processing is completed;

transfer control means for inhibiting processing of shifting the received data accumulated at said received data accepting means to said data storage means when receiving a notification of the suspension of data transfer processing from said state control means of said data transmission means;

wherein said state control means transmits flag data as the information indicative of an execution status and suspension of data transfer processing to said data reception means, sets up said flag data so as to demand preparation for data reception at said data reception means prior to the execution of the data transfer processing and restores said flag data when the data transfer is completed or suspended, and said transfer control means, when said flag data is restored before data to be transferred is all transferred, determines that the data transfer processing is suspended.

* * * * *